No. 669,995. Patented Mar. 19, 1901.
W. J. LINTON.
HYDRAULIC AIR COMPRESSING APPARATUS.
(Application filed Aug. 4, 1899.)
(No Model.) 3 Sheets—Sheet 1.

WITNESSES:
F. N. Roehrich
R. S. Rounds

INVENTOR
William J. Linton
BY
Wm. B. Whitney
ATTORNEY

No. 669,995. Patented Mar. 19, 1901.
W. J. LINTON.
HYDRAULIC AIR COMPRESSING APPARATUS.
(Application filed Aug. 4, 1899.)

(No Model.) 3 Sheets—Sheet 3.

WITNESSES:
F. N. Roehrich
R. S. Rounds

INVENTOR
William J. Linton
BY
Wm. B. Whitney
ATTORNEY

UNITED STATES PATENT OFFICE.

WILLIAM J. LINTON, OF WOODSTOCK, CANADA, ASSIGNOR TO JOHN A. INSLEE, OF ST. LOUIS, MISSOURI.

HYDRAULIC AIR-COMPRESSING APPARATUS.

SPECIFICATION forming part of Letters Patent No. 669,995, dated March 19, 1901.

Application filed August 4, 1899. Serial No. 726,145. (No model.)

*To all whom it may concern:*

Be it known that I, WILLIAM J. LINTON, a subject of the Queen of Great Britain, and a resident of Woodstock, Province of Ontario, and Dominion of Canada, have invented certain new and useful Improvements in Hydraulic Air-Compressors, of which the following is a specification, reference being made therein to the accompanying drawings, in which—

Figure 1:
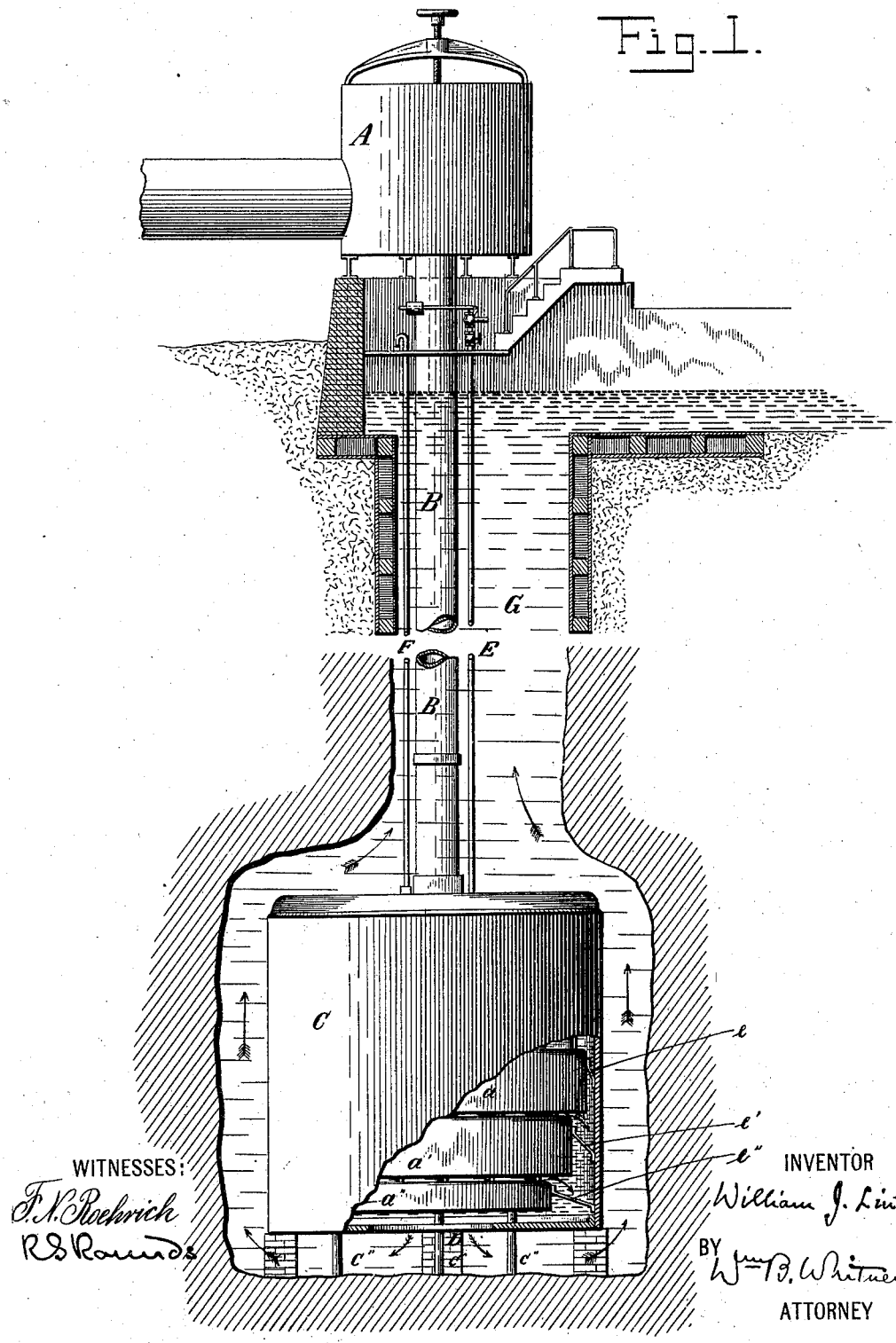
Figure 2:
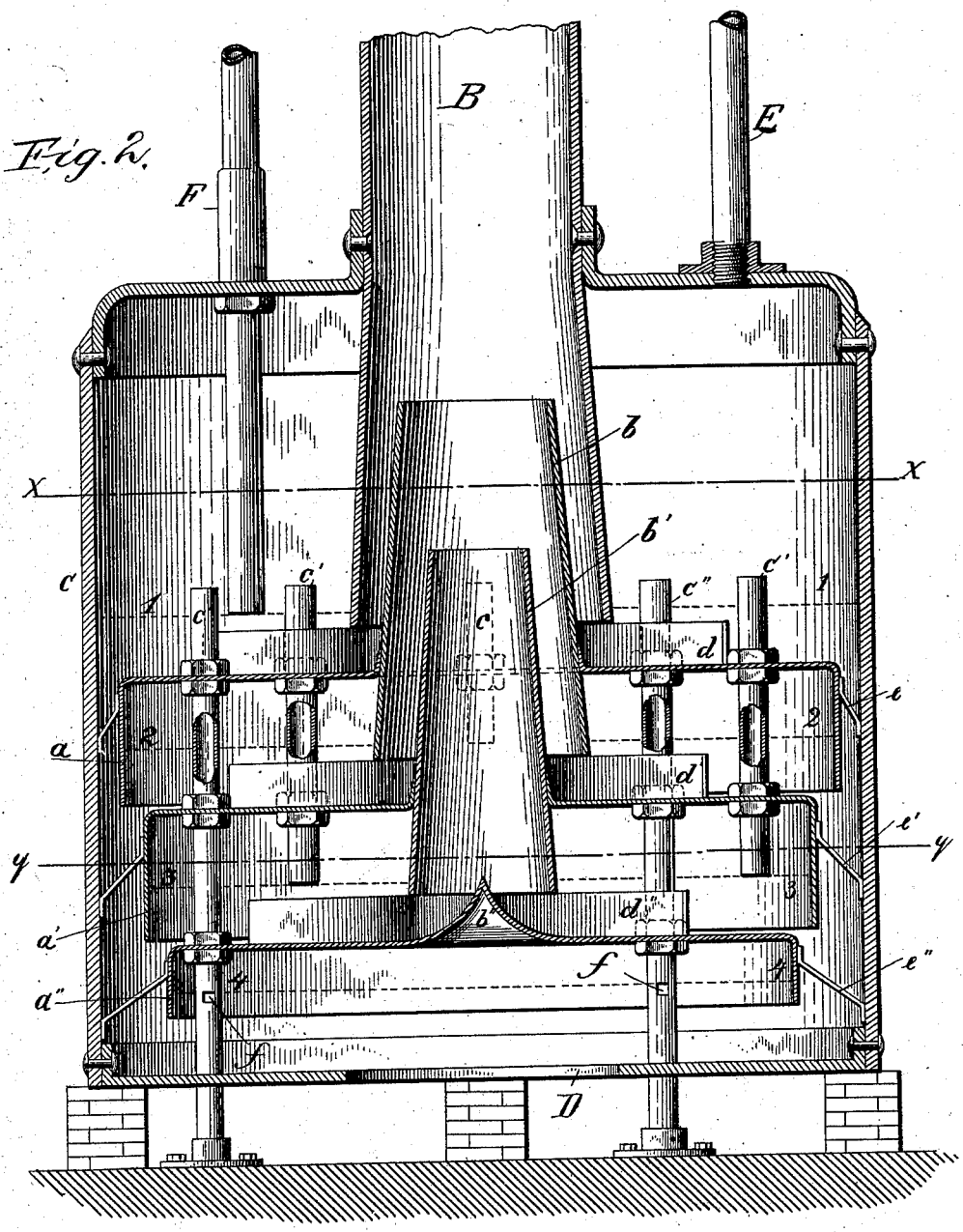
Figure 3:
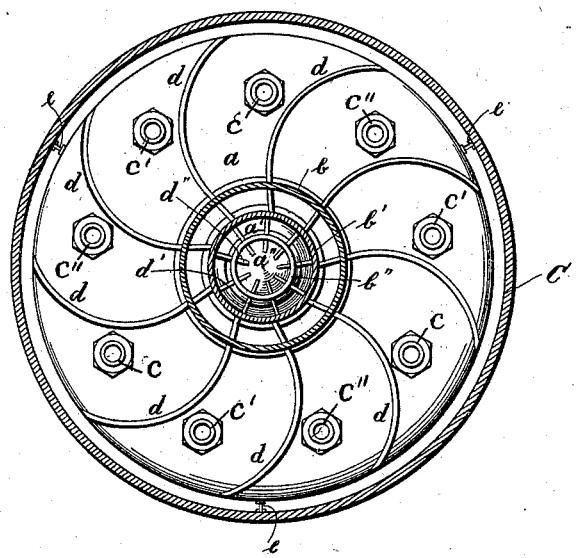
Figure 4:
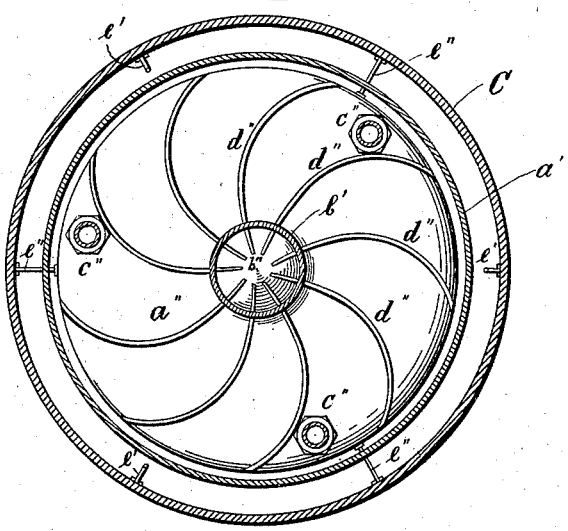

Figure 1 is an elevation, partly in section, of a hydraulic air-compressor of the type to which my invention relates; Fig. 2, an enlarged vertical section of the lower part or separator of such compressor and of my improvements; and Figs. 3 and 4, horizontal sections on the lines $xx$ and $yy$, respectively, of Fig. 2.

Similar letters refer to similar parts throughout the several views.

Apparatus of this kind consists, briefly, of an intake A, stand-pipe or conductor B, sunk in a well G, a separator or "expansion-chamber" C, with a water-outlet D in its bottom or around its base, an air-pipe E, and a blow-off pipe F, and its operation, the column of water in the well acting as the compressing agent, is as follows: The air to be compressed is introduced in the intake into the water which flows through the stand-pipe and is carried down therein to the separating-chamber, where it escapes from the water, and, collecting in the upper part of the separating-chamber, is carried off through the air-pipe to a tank or receiver, while the water, after having given up the air carried by it, flows out into and up and out of the well. It is also usual to have a "spreader" under the lower end of the stand-pipe to deflect the water as it enters the separating-chamber.

The object of my invention is to secure a better separation of the air from the water than that obtained in the single separating-chamber or expansion-chamber heretofore employed, and thereby to make possible a reduction in the size of the excavation at the bottom of the well, and consequently in the cost of installation, without decreasing the efficiency of the apparatus.

The invention consists, broadly speaking, in subdividing the main body of water into different portions and effecting the separation of the air from such divided portions of the water, and I attain this object by subdividing the column of water flowing down through the stand-pipe at or near its lower end and effecting the separation of the air from a portion or portions of the water in one or more additional separating-chambers, as illustrated in the drawings and hereinafter described.

$a$ is a separating-chamber secured in place within an outer separating chamber C, beneath the lower end of the stand-pipe B. A section of pipe $b$, smaller in diameter than the stand-pipe and extending upwardly to or preferably a short distance within its lower end and downwardly through the top to about the middle of the separating-chamber $a$, subdivides the water flowing down through the stand-pipe and conducts a portion thereof down into this separating-chamber. The air which here separates from the water rises through one or more pipes $c$ to the upper part of separating-chamber C after collecting in sufficient quantity to force the level of the water down to the lower end of the air-pipes, (dotted line 2 2, Fig. 2.) The water flowing down through the conductor-pipe $b$ may in turn be subdivided by a second conductor-pipe $b'$, smaller in diameter than pipe $b$ and extending upwardly to or within its lower end, and a portion of the water carried down thereby into a second separating-chamber $a'$, secured in place in the outer separating-chamber C, below the separating-chamber $a$. One or more air-pipes $c'$ allow the air which is collected in this second separating-chamber to pass up into the upper part of separating-chamber C. The process of subdivision may be continued, if desired, by the addition of other separating-chambers, provided with conductor and air pipes similar to those of the two separating-chambers already described, placed one under another below separating-chamber $a'$. Below these separating-chambers is still another separating-chamber $a''$, which I prefer to employ in place of the usual spreader in the lower part of the main separating-chamber. It not only performs the functions of a spreader, but also supplements the work of the other separating-chambers, as all the water which passes through them is carried under it on the way out to the well through the opening D, and any air still remaining therein is here separated and rises through openings $f$ in the air-pipes $c''$ to the upper part of the separating-chamber C.

The upper surface of the separating-chambers $a$, $a'$, and $a''$, which serve as spreaders for the separating-chamber immediately above, may, if desired, be provided with curved radial ribs $d$ $d'$ $d''$ to give a rotating motion to the water in the separating-chambers. The separating-chamber $a''$ may have a conical upward projection $b''$.

The separating-chambers $a$, $a'$, and $a''$ may be supported upon the air-pipes and braced to the outer separating-chamber by rods $e$, $e'$, and $e''$, as shown, or they may be secured in place in any suitable manner.

In certain cases it may be desirable to modify the construction of the outer separating-chambers C by omitting the bottom with the central opening D entirely and extending its side walls down only to the top or to about the lower edge of the side wall or rim of separating-chamber $a$, supporting and securing it in position in any suitable manner, and this can be done without departing from the spirit of my invention. As thus modified it is obvious that the water which passes through the outer separating-chamber and the separating-chambers $a$ and $a'$ will pass out under their lower edges or rims directly into the well without being carried down under the separating-chamber $a''$, which may be omitted and its place supplied with the usual spreader, with or without curved radial ribs on its upper surface. In this construction the separating-chambers $a$ and $a'$ may be said to be located one below another—below rather than within the outer or, as thus modified, more strictly, upper separating-chamber.

While I have shown and described only one arrangement of the pipes which serve as air-outlets for the air collected in the several separating-chambers, this arrangement is not essential and may be modified in several particulars. For example, the lower ends of these pipes may simply pass through the top plate or wall of the separating-chambers and need not extend down into them as shown, and, again, the air-pipes of the lower separating-chambers may terminate in the upper part of the separating-chamber immediately above instead of passing on up into the outer separating-chamber, or the same result may be obtained by omitting the air-pipes $c$ and $c'$ and making the pipes $c''$ serve for all the separating-chambers by making openings in them similar to opening $f$ just below the top plate or wall of separating-chambers $a$ and $a'$. I prefer, however, that the lower ends of or the openings into the air-pipes, whether one or more of such pipes is provided for each separating-chamber or one set of pipes for all of the separating-chambers, be below the lower surface of the roofs of the several separating-chambers, for the reason that as this arrangement does not permit the escape of any air from the separating-chambers until it has collected in sufficient quantity to force the level of the water therein down to the air-outlets, as above pointed out, a level surface of water cushioned by the air thus collected and retained is provided, thereby facilitating the separation of air from the water passing through each separating-chamber.

What I claim as my invention, and desire to secure by Letters Patent, is—

1. In an air-compressor in which a body of water flowing first downwardly and then upwardly is used as the compressing agent, means for introducing air into the descending body of water, means for subdividing the said descending body of water and intermingled air before the separation of air therefrom, separate means for effecting the separation of the air from each of the subdivided portions of water, and means for conducting the air to any desired point or points of distribution, for the purpose set forth.

2. In a hydraulic air-compressor of the character described, the combination of two or more separating-chambers to each of which a portion only of the water flowing through the compressor is conducted, for the purpose set forth.

3. In a hydraulic air-compressor of the character described, the combination of three or more separating-chambers to each of which, with one exception, a portion only, and to one of which the whole, of the water flowing through the compressor is conducted, for the purpose set forth.

4. In a hydraulic air-compressor, the combination of a stand-pipe, two or more separating-chambers located one below another and each provided with air-outlets, and means for subdividing the water and intermingled air flowing down through the stand-pipe of the compressor and conducting a portion thereof through each separating-chamber, for the purpose set forth.

5. In a hydraulic air-compressor, the combination, with a stand-pipe and an outer separating-chamber, of one or more separating-chambers located therein, and means for subdividing the water flowing down through the stand-pipe and conducting a portion thereof through each separating-chamber, for the purpose set forth.

6. In a hydraulic air-compressor, the combination with a stand-pipe and an outer separating-chamber, of two or more separating-chambers located one below another therein, and means for subdividing the water flowing down through the stand-pipe and conducting a portion thereof through each separating-chamber, except the lowest, and for then reuniting all the water and conducting it through the lowest separating-chamber, for the purpose set forth.

7. In a hydraulic air-compressor, the combination, with a stand-pipe and an outer separating-chamber, of one or more separating-chambers located therein and each provided with a water-conductor pipe to carry to it a portion of the water flowing down through the stand-pipe or main conductor and one or more air-outlets, for the purpose set forth.

8. In a hydraulic air-compressor, the combination, with a stand-pipe and an outer separating-chamber, of two or more separating-chambers located one below another therein and each, except the lowest, provided with a water-conductor pipe to carry to it a portion of the water flowing down through the stand-pipe or main conductor, and all with air-outlets, for the purpose set forth.

9. In a hydraulic air-compressor, the combination with a stand-pipe and an upper separating-chamber, of one or more separating-chambers located one below another below the upper separating-chamber, and means for subdividing the water flowing down through the stand-pipe and conducting a portion thereof through each of said separating-chambers, for the purpose set forth.

10. In a hydraulic air-compressor, the combination, with a stand-pipe and an upper separating-chamber, of one or more separating-chambers located one below another below the upper separating-chamber and each provided with a water-conductor pipe to carry to it a portion of the water and intermingled air flowing down through the stand-pipe or main conductor and one or more air-outlets, for the purpose set forth.

11. In a hydraulic air-compressor of the character described, the combination, with the separating-chamber, of a second or supplemental separating-chamber located therein and provided with one or more air-outlets the openings into which are below the lower surface of the roof of the said supplemental separating-chamber, for the purpose set forth.

12. In a hydraulic air-compressor, the combination, with a stand-pipe and a separating-chamber, of a spreader located therein and below the lower end of the stand-pipe and having curved radial ribs on its upper surface for imparting a rotating motion to the water flowing down from the stand-pipe through the separating-chamber, substantially as described.

13. In a hydraulic air-compressor, the combination, with a stand-pipe and a separating-chamber having a water-outlet centrally located in its bottom wall, of a second separating-chamber located within the first and between the lower end of the stand-pipe and the said water-outlet and having curved radial ribs on its upper wall for imparting a rotating motion to the water flowing down from the stand-pipe through the separating-chamber, substantially as described.

14. In a hydraulic air-compressor, the combination, with a stand-pipe and an outer or upper separating-chamber, of one or more separating-chambers located one below another within or below the outer or upper separating-chamber and each provided with curved radial ribs on its upper wall, substantially as and for the purpose described.

15. In a hydraulic air-compressor, the combination of two or more separating-chambers in which the separation of air from different portions of the body of water flowing through the compressor is effected, and means, substantially as described, for imparting a rotating motion to the water within each of the said separating-chambers.

16. In a hydraulic air-compressor, the combination, with a stand-pipe B and separating-chamber C, of a separating-chamber $a$ provided with water-conductor pipe $b$ and one or more air-outlets $c$, substantially as and for the purpose described.

17. In a hydraulic air-compressor, the combination, with a stand-pipe B, separating-chamber C, and air-pipe E, of a separating-chamber $a''$ provided with one or more air-outlets $c''$ the openings into which are below the lower surface of the roof of the separating-chamber $a''$, for the purpose set forth.

18. In a hydraulic air-compressor, the combination, with a stand-pipe B and separating-chamber C, of a separating-chamber $a$ provided with water-conductor pipe $b$ and one or more air-outlets $c$ and having curved radial ribs on its upper wall for imparting a rotating motion to the water flowing down from the stand-pipe through the separating-chamber C, substantially as and for the purpose described.

19. In a hydraulic air-compressor, the combination, with a stand-pipe B and separating-chamber C, of a separating-chamber $a''$ provided with one or more air-outlets $c''$ and having curved radial ribs on its upper wall for imparting a rotating motion to the water flowing down from the stand-pipe through the separating-chamber C, substantially as and for the purpose described.

In testimony whereof I have affixed my signature in presence of two witnesses.

WILLIAM J. LINTON.

Witnesses:
R. L. MURCHISON,
R. ROBILLARD.